US010031005B2

(12) United States Patent
Ding

(10) Patent No.: US 10,031,005 B2
(45) Date of Patent: Jul. 24, 2018

(54) METHOD AND APPARATUS FOR SELF VERIFICATION OF PRESSURE-BASED MASS FLOW CONTROLLERS

(71) Applicant: MKS Instruments, Inc., Andover, MA (US)

(72) Inventor: Junhua Ding, Boxborough, MA (US)

(73) Assignee: MKS Instruments, Inc., Andover, MA (US)

( * ) Notice: Subject to any disclaimer, the term of this patent is extended or adjusted under 35 U.S.C. 154(b) by 505 days.

(21) Appl. No.: 13/626,432

(22) Filed: Sep. 25, 2012

(65) Prior Publication Data

US 2014/0083514 A1    Mar. 27, 2014

(51) Int. Cl.
| | |
|---|---|
| *G01F 1/36* | (2006.01) |
| *G05D 7/06* | (2006.01) |
| *G01F 25/00* | (2006.01) |
| *G01F 1/86* | (2006.01) |
| *G01F 1/88* | (2006.01) |
| *G01F 15/02* | (2006.01) |
| *G01F 15/04* | (2006.01) |

(52) U.S. Cl.
CPC .............. *G01F 1/363* (2013.01); *G01F 1/86* (2013.01); *G01F 1/88* (2013.01); *G01F 15/022* (2013.01); *G01F 15/024* (2013.01); *G01F 15/043* (2013.01); *G01F 15/046* (2013.01); *G01F 25/0007* (2013.01); *G05D 7/0647* (2013.01); *Y10T 137/0379* (2015.04); *Y10T 137/7761* (2015.04)

(58) Field of Classification Search
None
See application file for complete search history.

(56) References Cited

U.S. PATENT DOCUMENTS

| | | |
|---|---|---|
| 4,487,213 A | 12/1984 | Gates et al. |
| 6,394,120 B1 | 5/2002 | Wichert |
| 6,439,253 B1 | 8/2002 | Easton |

(Continued)

FOREIGN PATENT DOCUMENTS

| | | |
|---|---|---|
| CN | 1513110 | 7/2004 |
| CN | 101208641 | 6/2008 |

(Continued)

OTHER PUBLICATIONS

International Search Report and the Written Opinion dated Feb. 11, 2014 from Corresponding PCT Application No. PCT/US2013/057184.

(Continued)

*Primary Examiner* — Dennis M Butler
(74) *Attorney, Agent, or Firm* — McDermott Will & Emery LLP

(57) ABSTRACT

A mass flow control system can be self verified for its accuracy when controlling a flow to a process. The system comprises: a control valve for controlling the flow of fluid through the system as a function of a control signal; a controller for generating the control signal as a function of measured flow of fluid through the system and a targeted flow set point; a pressure sensor for measuring the controlling fluid pressure for use in measuring and verifying the flow rate; and a source of fluid for providing a known volume of fluid for use in verifying the system accuracy anytime between steps of the flow control process.

14 Claims, 2 Drawing Sheets

(56) References Cited

U.S. PATENT DOCUMENTS

Figure 1:
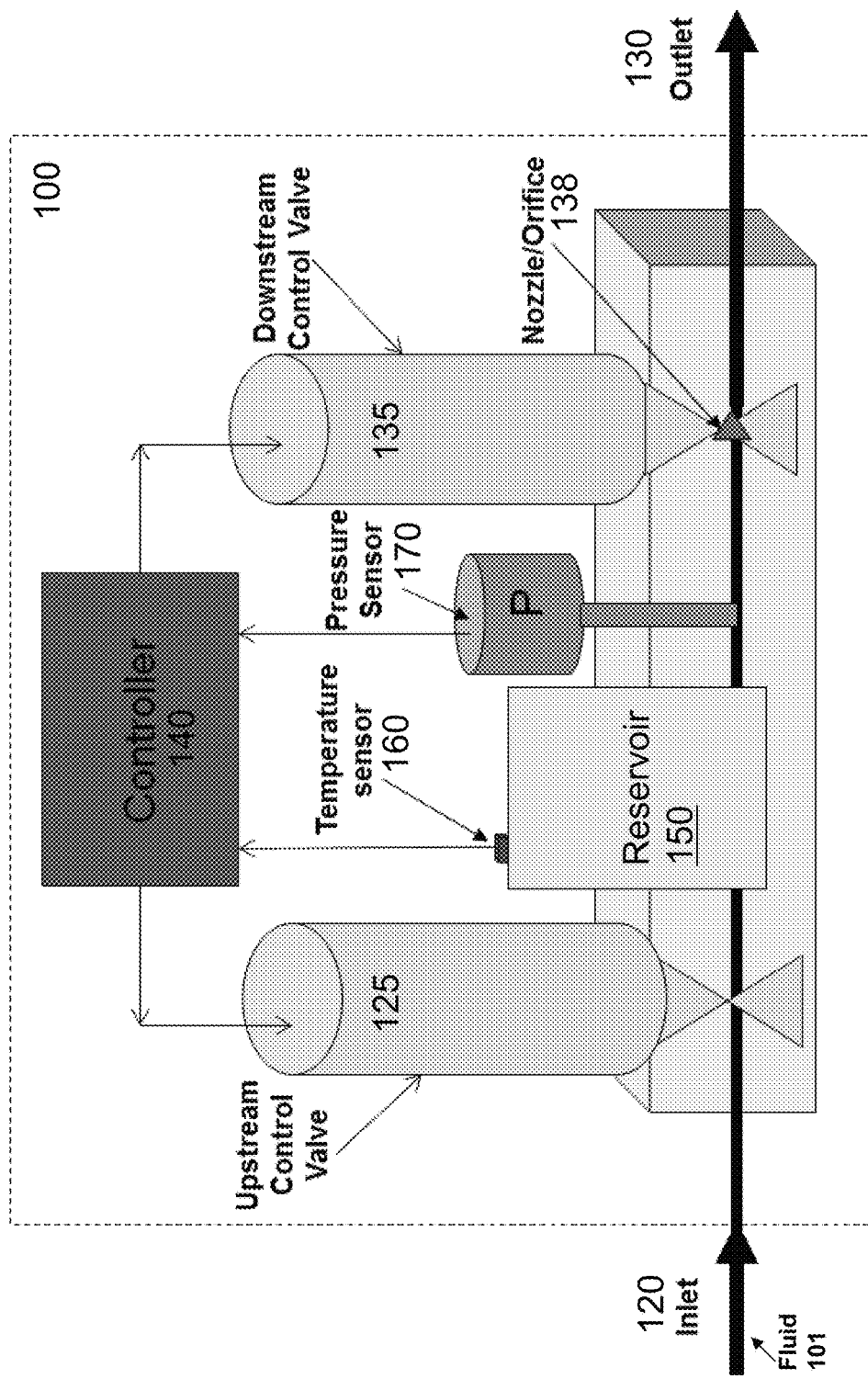

| | | |
|---|---|---|
| 7,636,640 B2 | 12/2009 | Wang et al. |
| 7,654,151 B2 | 2/2010 | Agar et al. |
| 7,658,204 B2 | 2/2010 | Ishida |
| 7,823,436 B2 | 11/2010 | Monkowski et al. |
| 8,109,289 B2 | 2/2012 | Trnka et al. |
| 8,240,324 B2 | 8/2012 | Monkowski et al. |
| 8,265,888 B2 | 9/2012 | Chung et al. |
| 8,271,210 B2 | 9/2012 | Chung et al. |
| 8,271,211 B2 | 9/2012 | Chung et al. |
| 8,356,623 B2 | 1/2013 | Isobe et al. |
| 8,504,318 B2 | 8/2013 | Mendelson et al. |
| 8,751,180 B2 | 1/2014 | Lull et al. |
| 2002/0083984 A1 | 7/2002 | Easton |
| 2003/0039550 A1 | 2/2003 | Wichert |
| 2006/0008328 A1* | 1/2006 | Morgan ............... G05D 7/0647 406/10 |
| 2006/0278276 A1* | 12/2006 | Tanaka ................ G05D 7/0635 137/487.5 |
| 2006/0283254 A1 | 12/2006 | Ding et al. |
| 2007/0113641 A1 | 5/2007 | Ding et al. |
| 2009/0112504 A1* | 4/2009 | Ding et al. .................... 702/100 |
| 2009/0183548 A1* | 7/2009 | Monkowski et al. ......... 73/1.35 |
| 2009/0183549 A1 | 7/2009 | Monkowski et al. |
| 2009/0183584 A1 | 7/2009 | Valoff et al. |
| 2009/0212847 A1 | 8/2009 | Schultz et al. |
| 2009/0266139 A1* | 10/2009 | Gregor et al. ................. 73/1.16 |
| 2010/0080262 A1 | 4/2010 | McDonald |
| 2010/0125424 A1 | 5/2010 | Ding et al. |
| 2010/0209859 A1 | 8/2010 | Inoue et al. |
| 2011/0022334 A1* | 1/2011 | Ding ........................ G01F 5/00 702/47 |
| 2011/0108126 A1 | 5/2011 | Monkowski et al. |
| 2011/0139271 A1 | 6/2011 | Hirata et al. |
| 2011/0284500 A1 | 11/2011 | Rappl et al. |
| 2012/0132291 A1 | 5/2012 | Monkowski et al. |
| 2012/0216888 A1 | 8/2012 | Ding et al. |
| 2012/0304781 A1 | 12/2012 | Monkowski et al. |
| 2013/0186486 A1 | 7/2013 | Ding |

FOREIGN PATENT DOCUMENTS

| | | |
|---|---|---|
| CN | 101238357 | 8/2008 |
| CN | 101583855 | 11/2009 |
| CN | 101796378 | 8/2010 |
| CN | 101160508 B | 9/2010 |
| CN | 102124418 | 7/2011 |
| CN | 102301208 A | 12/2011 |
| CN | 102483344 A | 5/2012 |
| CN | 102687087 A | 9/2012 |
| DE | 102009046758 A1 | 5/2011 |
| EP | 1096351 A1 | 5/2001 |
| JP | H3166611 | 7/1991 |
| JP | H3211601 | 9/1991 |
| JP | H08312908 | 11/1996 |
| JP | 2004246826 | 9/2004 |
| JP | 2011530755 | 12/2011 |
| JP | 2012103812 A | 5/2012 |
| JP | 2003167630 | 6/2013 |
| TW | I223056 | 11/2004 |
| TW | 200613700 B | 4/2007 |
| TW | 200819712 A | 5/2008 |
| WO | WO2010018191 | 2/2010 |
| WO | 2011047361 | 4/2011 |
| WO | WO2013134141 | 9/2013 |

OTHER PUBLICATIONS

Office Action dated Oct. 2, 2015 from corresponding Taiwan Patent Application No. 104106156.

International Search Report and the Written Opinion from corresponding PCT Application No. PCT/US2015/015831 dated May 22, 2015.

Office Action dated Aug. 18, 2015 from corresponding Japanese Application No. 2014-553321.

Brooks Instrument, Installation and Operation Manual, X-TMF-GF100-Series-MFC-eng, Part No. 541B137AAG, 82 pages (2013).

Brooks Instrument, Data Sheet GF135 Digital Mass Flow Controller, 10 pages (2013).

International Search Report and the Written Opinion dated Mar. 11, 2013 from corresponding PCT Application No. PCT/US2013/020790.

International Search Report and the Written Opinion from corresponding PCT Application No. PCT/US2015/012851 dated Apr. 28, 2015.

Office Action dated Sep. 23, 2015 from corresponding Korean Patent Application No. 10-2014-7022413.

Non-Final Office Action dated Jun. 29, 2015 from corresponding U.S. Appl. No. 13/354,988.

Office Action dated Dec. 4, 2015 from corresponding Chinese Patent Application No. 201380005938.6.

* cited by examiner

METHOD AND APPARATUS FOR SELF VERIFICATION OF PRESSURE-BASED MASS FLOW CONTROLLERS

FIELD

The present disclosure relates generally to mass flow controllers, and more particularly to self verification of pressure based mass flow controllers. As used herein the term "gas" is considered to include a gas or vapor.

BACKGROUND

In general, a mass flow controller (MFC) controls and monitors the rate of fluid (i.e., a gas or vapor) flow in real time so that the flow rate of the mass of a gas passing though the device can be metered and controlled. Mass flow controllers (MFCs) are often used to control the flow of gases during a semiconductor manufacturing process wherein the flow of gases into a semiconductor tool, such as a vacuum chamber, must be carefully controlled in order to produce high yield semiconductor products. MFCs are usually designed and calibrated to control the flow rate of specific types of gas at particular ranges of flow rates. The devices control the rate of flow based on a given set point, usually predetermined by the user or an external device such as the semiconductor tool itself. The set point can be changed with each step of a process depending on the desired flow rate for each step. MFCs can be either analog or digital. They are typically designed to be used with pressure ranges of the inlet gases, with low pressure and high pressure MFCs being typically available. All MFCs have an inlet port, and outlet port, a mass flow meter including a mass flow sensor and a proportional control valve. A system controller is used as a part of a feedback control system that provides a control signal to the control valve as a function of a comparison of the flow rate as determined by the set point with the measured flow rate as sensed by the mass flow sensor. The feedback control system thus operates the valve so that the measured flow is maintained at the flow rate as determined by the set point.

Such control systems assume that the MFC remains in calibration within certain tolerances. In order to test whether a MFC is within the tolerances of calibration, the MFC is typically tested off line with such devices as mass flow verifiers. The latter are used to test the flow rates. While off line testing is very accurate, there is always a problem that a MFC can become out of calibration during the running of a process (in real time), and not be detected until the process is completed. Often this can result in lower yields of semiconductor product, and even a complete failure resulting in the loss of the entire product yield. This can be expensive, and is clearly undesirable. What is needed is a system and method for continually testing the accuracy of a MFC in real time while processes are being run.

Mass flow controllers include two types, thermal-based and pressure-based mass flow controllers. U.S. patent application Ser. No. 13/354,988 filed Jan. 20, 2012 in the name of Junhua Ding, entitled "System and Method of Monitoring Flow Through Mass Flow Controllers in Real Time"; and assigned the present assignee, describes a system and method for testing a thermal-based mass flow controller so that the accuracy of the mass flow controller can be verified without going off line.

SUMMARY

Certain embodiments of the present invention relate to a mass flow control system whose accuracy can be self verified in real time when controlling a flow of a fluid to a process, the system comprising:
a control valve for controlling the flow of fluid through the system as a function of a control signal;
a controller for generating the control signal as a function of measured flow of fluid through the system and a set point; and
a source of fluid for providing a known volume of fluid for use in verifying the accuracy of the system anytime between steps of the flow control process. In one implementation, the system further includes a flow restrictor to generate chocked flow condition for flow measurement; a pressure sensor for providing a pressure measurement signal representative of the measured pressure of fluid upstream to the flow restrictor in the system; and a temperature sensor for providing a temperature measurement signal representative of the measured temperature of fluid in the system.

In another implementation, the system further includes a second pressure sensor for providing a pressure measurement signal representative of the measured pressure of fluid downstream to the flow restrictor such that the flow rate can be measured for non-chocked flow condition.

In accordance with another implementation, a method of verifying the accuracy of a mass flow control system when controlling a flow to a process is provided. The method comprises: controlling the flow of fluid through the system as a function of a control signal; generating the control signal as a function of measured flow of fluid through the system and a set point; and providing a known volume of fluid for use in verifying the accuracy of the system anytime between steps of the flow control process.

GENERAL DESCRIPTION OF THE DRAWINGS

The drawing figures depict one or more implementations in accord with the present teachings, by way of example only, not by way of limitation. In the figures, like reference numerals refer to the same or similar elements.

Figure 2:
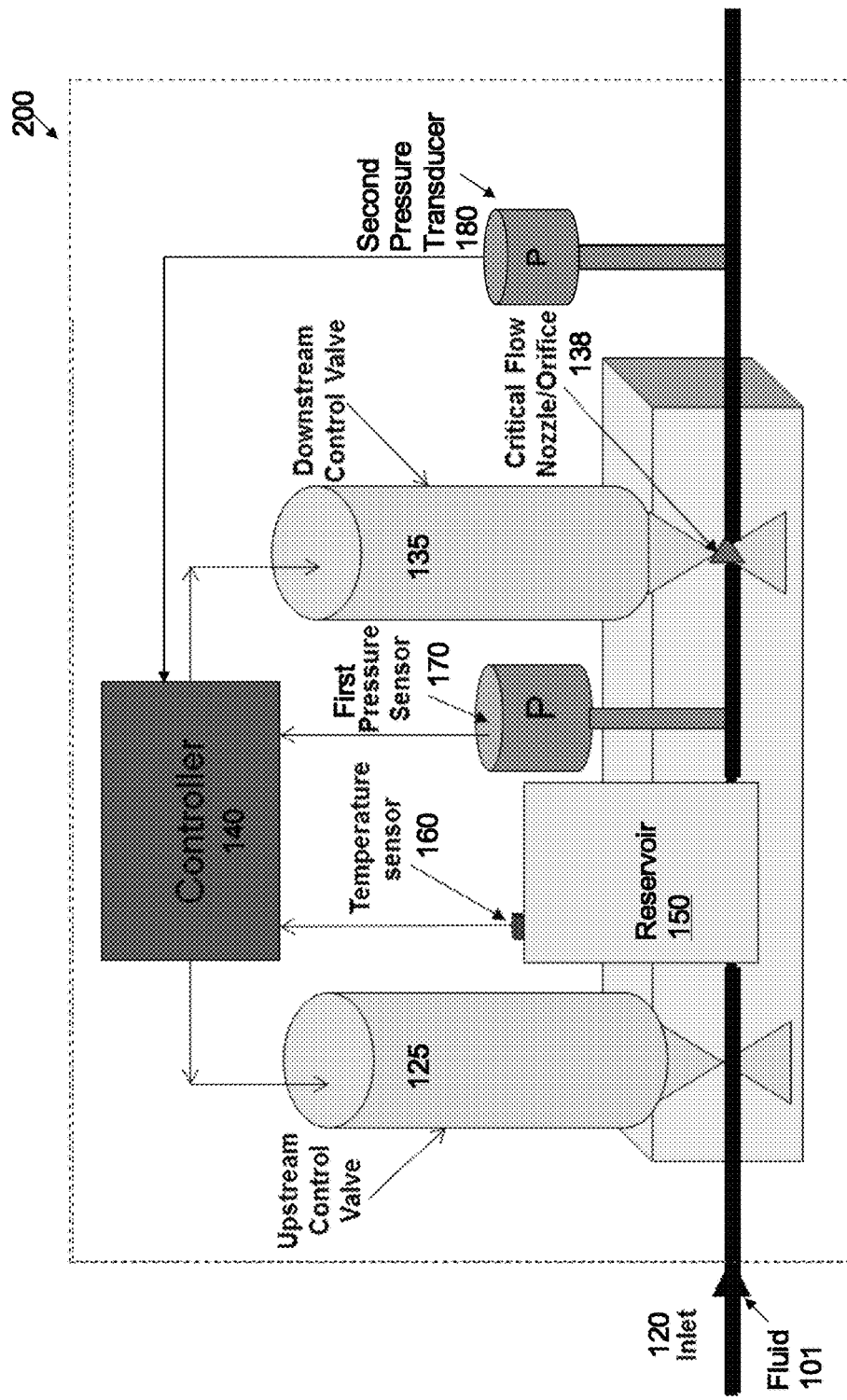

FIG. 1 is a general schematic diagram of one embodiment of a pressure-based MFC configured to allow testing of the accuracy of the MFC without going off line; and FIG. 2 is a general schematic diagram of a second embodiment of a pressure-based MFC configured to allow testing for the accuracy of the MFC without going off line.

DETAILED DESCRIPTION OF THE DRAWINGS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

The present disclosure relates to a pressure-based MFC. There are two embodiments, one is used for choked flow conditions, and the other for non-choked flow conditions. As will be seen, one device can be configured to operate in either mode.

Choked flow is a compressible flow effect. The parameter that becomes "choked" or limited is the velocity of the fluid. Choked flow is thus a fluid dynamic condition in which a fluid flowing through the MFC at a given pressure and temperature will increase in velocity as it passes through a restriction (such as an orifice of fixed cross sectional area or a nozzle) into a lower pressure environment. Choked flow is a limiting condition which occurs when the mass flow rate will not increase with a further decrease in the downstream pressure environment while upstream pressure is fixed. Under choked flow conditions, the mass flow rate can be increased by increasing the upstream pressure, or by decreasing the upstream temperature. The choked flow of gases is useful in many applications because the mass flow rate is independent of the downstream pressure, depending only on the temperature and pressure on the upstream side of the restriction. Under choked flow conditions, flow restrictive devices, such as valves, calibrated orifice plates and nozzles can be used to produce a desired mass flow rate. For chocked flow condition, the upstream pressure Pu and the downstream pressure Pd to the flow restrictor must satisfy the following criterion:

$$\frac{P_d}{P_u} \leq \left(\frac{2}{\gamma+1}\right)^{\gamma/(\gamma-1)} \quad (1)$$

Where γ is the specific heat ratio of the gas.

As shown in FIG. 1, an embodiment of the new pressure based MFC 100 is configured (a) for choke flow conditions and (b) to provide information enabling verification of the accuracy of the MFC in real time. The MFC 100 receives fluid 101 at an inlet 120 of MFC 100. The fluid is directed from the inlet 120 through a conduit of a support block to an outlet 130. The upstream portion of the block of MFC 100 supports an upstream control valve 125 configured to regulate the flow rate of the fluid 101 through the outlet 130 of the MFC 100 in response to and as a function of a flow control signal applied to the upstream valve. Specifically, the upstream control valve 125 is operable in any position between a fully opened and fully closed position as a function of and in response to a flow control signal from the controller 140 so as to control the flow rate of the fluid 101 from the outlet 130 of the MFC. The flow control signal is generated by controller 140 as a function of a (a) set flow signal shown applied to the controller 140 and representing the desired (flow set point) flow rate of fluid through the MFC (set by a user and/or an external program from an external device such as a standalone computer or a process tool), and (b) a measured flow signal representing the measured flow rate which is a function of the pressure and temperature of the fluid flowing through the MFC. Controller 140 includes memory for storing calibration coefficients necessary to provide an accurate measured flow signal based the sensed temperature and pressure signals received by the system. In the embodiment shown, this measure flow signal is provided as a function of a pressure signal provided by the pressure sensor 170 (shown in FIG. 1 in the form of a pressure transducer), and a temperature signal provided by a temperature sensor 160. The outlet 130 of the MFC 100 is provided with some type of flow restriction, which can be provided by the downstream control valve 135 (by controlling the position of the valve so as to create a restrictive opening), or by a separate device, such as a flow nozzle/orifice 138 which has the effect of limiting the flow and pressure of the fluid flowing from the outlet 130 under choke flow conditions.

In order to verify the accuracy of the MFC in real time, the illustrated embodiment of FIG. 1, the MFC 100 also further includes the downstream control valve 135 supported by the block at the outlet 130, and a reservoir 150. The reservoir 150 is supported by the block between the upstream control valve 125 and the downstream control valve 135. The reservoir 150 is configured to store a known volume of fluid that flows into the MFC. The temperature sensor 160 is coupled to the reservoir 150 so that it measures the temperature of the wall of the reservoir, approximating the temperature of the fluid in the reservoir 150 and thus the fluid flowing in the MFC. The temperature sensor 160 provides to the controller 140 a signal representative of the measured temperature. The measured flow rate is a function of this measure temperature, as well as the pressure as measured by the pressure sensor 170. Pressure sensor 170 is also coupled with the outlet 130, between the upstream control valve 125 and the downstream control valve 135, and configured to measure the pressure of the fluid 101 flowing through the conduit to the flow restrictor shown as a nozzle/orifice 138 of the downstream control valve 135.

During operation of a process, the downstream control valve 135 is open, and the flow set point is set at a non-zero value, causing the controller 140 to control the flow through the upstream valve 125 so that the measured flow will equal the non-zero set value. Data representing the sensed temperature and pressure is transmitted, in the form of signals from the temperature sensor 160 and the pressure sensor 170, to the controller 140 for use in determining the measured mass flow flowing through the MFC. As described in greater detail below, the controller 140 determines the measured flow rate based on Equation (2) for a chocked flow condition:

$$Q_p = C' \cdot A \cdot f(m, \gamma, T) \cdot P_u, \quad (2)$$

Where C' is the orifice discharge coefficient of nozzle/orifice 138, A the effective orifice area, m the molecular weight of the gas, γ the specific heat capacity ratio of the gas, T the gas temperature, Pu the upstream pressure, and f(m, γ, T) a mathematic function which is related to the gas molecular weight m, the specific heat capacity of the gas γ, and the gas temperature T.

The controller 140 provides valve control signals to the upstream valve 125 for controlling the flow into and out of the MFC 100 so that the measured flow rate $Q_p$ tracks the flow commanded by the flow set point. The two will remain substantially equal (within allowed tolerances) so long as the MFC is properly calibrated. Where downstream control valve 135 is used to define the orifice of the flow restrictor, during choke flow conditions, the position of downstream control valve 135 will remain unchanged.

A flow verification check can be performed anytime a zero set point is commanded, as for instance the period between two steps of a gas delivery process, or following the completion of the process. During the flow verification period, the controller 140 automatically closes the upstream control valve 125 allowing the controller 140 to verify the flow rate based on the rate of decay of the pressure signal provided by the pressure sensor 170 as the fluid continues to flow from the reservoir 150 (which is at a higher pressure than the pressure downstream of the MFC). This verification period typically requires about 100-300 msec to perform the measurement. In certain embodiments, the verification period may be between 100 to 300 milliseconds. During this verification period, fluid 101 from the reservoir 150 is directed out the outlet 130 of the MFC 100. The flow rate determined by the rate of decay principle, $Q_v$, which is indicative of the flow rate at which the remaining fluid 101 is exiting the system, can be determined by Equation (3):

$$Q_v = -k \cdot V \cdot \frac{d(P_u/T)}{dt}, \quad (3)$$

where t denotes time, k denotes a conversion constant and V, $P_u$, and T respectively denote the volume of the reservoir 150, pressure of the gas as measured by the pressure sensor 170, and temperature of the gas as measured by the temperature sensor 160.

Once the verification period is over, downstream control valve 135 is completely closed to prevent any remaining fluid 101 from exiting the MFC 100. During the verification period, MFC 100 verifies the calculated flow rate $Q_p$ using Equation (2) against the rate of decay flow rate, $Q_v$ as determined in accordance with Equation (3).

If the deviation of $Q_p$ from $Q_v$ is above a predetermined accuracy tolerance limit, the MFC 100 can send out an alarm to the host controller (not shown) to warn of the out of calibration condition. Alternatively, the MFC 100 can mathematically adjust or update the coefficients such as C' and/or A in the flow calculation Equation (2) based on the verified value of $Q_v$ such that the flow error between $Q_p$ and $Q_v$ is minimized, at or below the predetermined accuracy tolerance limit. Hence, the MFC 100 is recalibrated within the tolerance limits during the flow verification period. Thus, once adjusted, when a non-zero condition is subsequently commanded, the MFC 100 uses the verified value of the flow rate to achieve the target flow rate, at which the fluid exits the system.

FIG. 2 shows an embodiment for operating the MFC for non-choke flow conditions. Specifically, the MFC 200 includes the same or similar components as the FIG. 1 embodiment, but with an additional pressure sensor (shown as second pressure transducer 180) arranged to sense the pressure of the gas downstream from the flow restrictor 138. The second pressure transducer 180 can be mounted to a support block or mounted separate from the support block.

It should be appreciated that the embodiment of FIG. 2 can be used for both choked flow conditions and non-choked flow conditions. The mode of operation of the FIG. 2 embodiment is thus determined whether the MFC 250 is to be operated for choked flow conditions or non-choked flow conditions.

For non-choked conditions, the measured flow rate is calculated by Equation (4) as $$Q_p = f(P_u, P_d, T, m, \gamma, A), \quad (4)$$

Wherein f is a mathematic function of the upstream pressure $P_u$, the downstream pressure $P_d$, the gas temperature T, the gas molecular weight m, the gas specific heat ratio $\gamma$ and the effective office area A.

During flow under non-choked flow conditions, for verification the upstream control valve 125 is again closed and gas will then flow from the reservoir 150 and out the outlet (not shown) (downstream from the downstream control valve 135) of the MFC 200. The verified flow rate, $Q_v$, is still determined by Equation (3) above.

Data relating to the values of $Q_p$ and $Q_v$ can be accumulated in the controller 140 and the data related to $Q_p$ and $Q_v$ can then be compared to determine whether the MFC is out of certain calibration tolerances. Further, the coefficients in Equation (4) can be updated to minimize the flow error between $Q_v$ and $Q_p$. Hence, the MFC 200 is recalibrated during the flow verification period.

Accordingly, the foregoing is a system and method for continually testing and verifying the calibration settings of a MFC in real time while processes are being run. In one additional implementation, the system can also do self-calibration by adjusting the flow calculation coefficients based on the verification results if there are differences between the current coefficients stored in the memory of the controller 140, and coefficients determined from the measurements made by the system. In such an arrangement, the coefficients of a flow calculation equation for the measured flow rate $Q_p$ can be recalculated based on the verification results such that the flow error between $Q_p$ and $Q_v$ is minimized, at or below a predetermined accuracy tolerance limit so as to recalibrate the system within the tolerance limits during the flow verification period.

Since other changes and modifications may be made in the above-described apparatuses and processes without departing from the scope of the invention herein involved, it is intended that all matter contained in the above-description shall be interpreted in an illustrative and not in a limiting sense.

What is claimed is:

1. A self-verifying mass flow control system for real time accuracy verification when controlling a flow of a fluid to a process, the system comprising:
   an inlet that receives a fluid under pressure;
   an outlet that delivers the fluid under pressure;
   a conduit through which the fluid flows under pressure;
   a control valve that controls the flow of fluid within the conduit from the inlet to the outlet;
   a reservoir connected to the conduit that stores a known volume of fluid;
   a flow restrictor between the reservoir and the outlet that controllably restricts fluid flow between the reservoir and the outlet;
   a single pressure sensor that is coupled to the conduit and senses the pressure of the fluid within the conduit providing as an output a signal indicative of the pressure; and
   a controller that controls position of the control valve and uses the signal from the single pressure sensor for two different operations of the mass flow control system:
     (i) flow control of the control valve for a process operation, based on the signal from the pressure sensor so as to cause the flow rate of fluid through the conduit to be equal to a flow set point; and
     (ii) flow verification of the accuracy of the fluid flow control by determining a rate of pressure decay within the reservoir based on the signal from the pressure sensor.

2. A mass flow control system according to claim 1 wherein the flow restrictor is controlled to create choked flow conditions for the flow of fluid through the conduit.

3. A mass flow control system according to claim 2, wherein the flow restrictor has an orifice whose cross sectional area is adjustable.

4. A mass flow control system according to claim 2, further including a second control valve for providing an adjustable opening that defines the flow restrictor.

5. A mass flow control system according to claim 1, further including a temperature sensor configured to provide a temperature measurement signal representative of the measured temperature of fluid in the conduit.

6. A mass flow control system according to claim 5, wherein the controller is configured to determine the measured flow of fluid $Q_p$ through the conduit as a function of the measured pressure and temperature of the fluid in the system as $$Q_p = C' \cdot A \cdot f(m, \gamma, T) \cdot P_u,$$

where C' is the orifice discharge coefficient of the flow restrictor, A the effective orifice area of the flow restrictor, m the molecular weight of the fluid, γ the specific heat capacity ratio of the fluid, T the fluid temperature, $P_u$ the pressure, and f(m, γ, T) a mathematic function which is related to the fluid molecular weight, the specific heat capacity of the fluid, and the fluid temperature.

7. A mass flow control system according to claim 1, wherein the reservoir is positioned downstream from the control valve such that the control valve is closed when a zero flow set point is commanded, and fluid is still allowed to flow from the reservoir and measured by the mass flow control system based on choked flow condition $Q_p$, wherein another flow measurement $Q_v$ is made by the rate of decay of the fluid from the reservoir as $$Q_v = -k \cdot V \cdot \frac{d(P_u/T)}{dt},$$

where t denotes time, k denotes a conversion constant and V, $P_u$, and T, respectively, denote the volume of the reservoir, a pressure and temperature of the fluid in the reservoir.

8. A mass flow control system according to claim 7, wherein the system can self verify its flow accuracy as a function of any differences between flow measurement made by the rate of decay of the fluid from the reservoir $Q_v$, and the flow rate measured by the system based on choked flow condition $Q_p$.

9. A mass flow control system according to claim 7, further including a second control valve wherein the second control valve is closed to fulfill a zero flow set point command after flow verification is completed.

10. A mass flow control system according to claim 7, wherein verification occurs during a verification period anytime between steps of the flow control process, the verification period being between 100 and 300 milliseconds.

11. A mass flow control system according to claim 7, wherein the reservoir is positioned between the control valve and the flow restrictor.

12. A mass flow control system according to claim 7, wherein the system provides an alarm to a host controller to warn of an out of calibration condition if the deviation of $Q_p$ from $Q_v$ is above a predetermined accuracy tolerance limit.

13. A mass flow control system according to claim 7, wherein the system can adjust the coefficients of the flow calculation equation for the measured flow rate $Q_p$ based on the verification results such that the flow error between $Q_p$ and $Q_v$ is minimized, at or below the predetermined accuracy tolerance limit so that the system is recalibrated within the tolerance limits during the flow verification period.

14. A mass flow control system according to claim 1, wherein the pressure sensor is a first pressure sensor for generating a signal as a function of the pressure of the fluid upstream from the flow restrictor and further comprising a second pressure sensor for generating a signal as a function of the pressure of fluid downstream from the flow restrictor for measurement of the flow of fluid during non-choke flow conditions, where the measured flow rate $Q_p$ is based on the following equation:

$$Q_p = f(P_u, P_d, T, m, \gamma, A),$$

wherein f is a mathematic function of upstream pressure $P_u$, downstream pressure $P_d$, fluid temperature T, gas molecular weight m, gas specific heat ratio γ and effective office area A.

* * * * *